M. BLAKEY.
Machine for Welding and Finishing Pipe.

No. 166,449. Patented Aug. 10, 1875.

Witnesses
J. E. Boggs
Henry A. Shaw

Inventor
Mildred Blakey,
by George H. Christy
his Atty.

UNITED STATES PATENT OFFICE.

MILDRED BLAKEY, OF ETNA, PENNSYLVANIA, ASSIGNOR OF ONE-THIRD HIS RIGHT TO JOHN L. ROBERTSON, OF SAME PLACE.

IMPROVEMENT IN MACHINES FOR WELDING AND FINISHING PIPE.

Specification forming part of Letters Patent No. 166,449, dated August 10, 1875; application filed July 8, 1875.

*To all whom it may concern:*

Be it known that I, MILDRED BLAKEY, of Etna borough, county of Allegheny, State of Pennsylvania, have invented or discovered a new and useful Improvement in Machine for Welding and Finishing Pipe; and I do hereby declare the following to be a full, clear, concise, and exact description thereof, reference being had to the accompanying drawing making a part of this specification, in which like letters indicate like parts.

Figure 1:
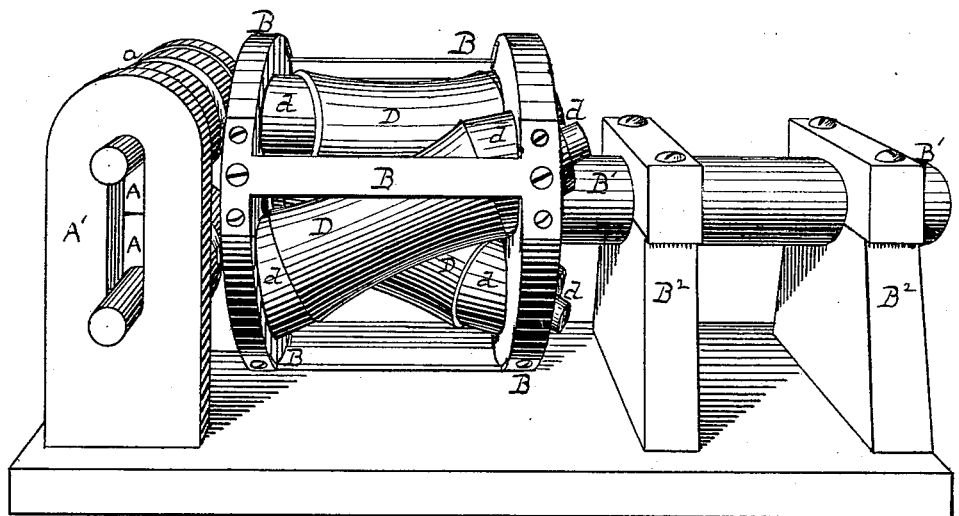
Figure 2:
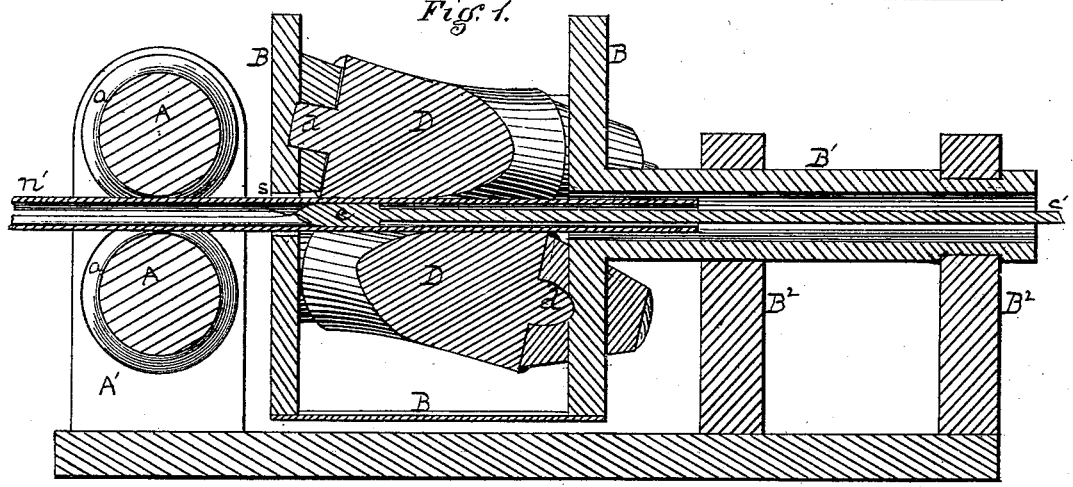
Figure 3:
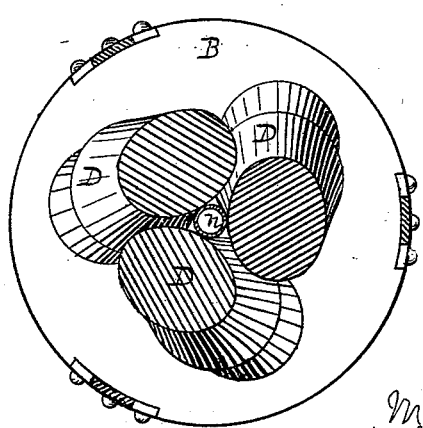

Figure 1 is a perspective view of the main operative parts of a machine incorporating my improvement. Fig. 2 shows a longitudinal vertical section thereof, with the mandrel in place for making lap-welded pipe; and Fig. 3 is a transverse vertical section through the welding and finishing rolls, and with a butt-welded pipe as operated on thereby.

My invention relates to the welding and finishing of pipe-skelps into pipe by means of a series of rolls which not only revolve on their axes, but also revolve around the pipe; and it consists in the features of construction and operation hereinafter described and claimed.

The feed-rolls A are mounted in any suitable housings A′, and are fitted up with suitable driving-gear, plummer-blocks, adjusting-screws, and other appliances ordinarily used. Each roll has a groove, $a$, of a depth and curvature equal, or about equal, (stated in general terms,) to the radius of the pipe to be welded and finished, so as to take a sufficiently firm and effective bite or bearing on the pipe as not only to feed it forward, but also to prevent it from being rotated on its axis while being welded and finished. At B I have shown a revolving head or stock, the axial line of which is in line with the feed-opening of the grooves $a\ a$. This head is carried by the hollow revolving axle or shaft $B^1$, which latter is supported in any convenient way by housings $B^2$. The head B is rotated by any suitable arrangement of driving gear or equivalent mechanism, so as to have a positive motion. In this head, around and at equal distances from the central line of feed, I arrange a series of rolls, D, two or more in number. Each roll is made with a face somewhat concave in the direction of its length, and is set not parallel with the line of feed, but angularly thereto, or rather crosswise thereof, so that a plane passing lengthwise through the axis of each roll, and cutting the line of feed, will make an angle therewith. The degree of curvature of the periphery of the rolls D, as well as the angle at which they are set, may be varied at pleasure, in accordance with principles already known in the arts, the object being to get a long line of bite in the action of the rolls D on the pipe. These rolls D have their bearing, as at $d$, in the end plates of the head or stock B, or in suitable bearing-blocks attached thereto, and in their action on the pipe they may receive their rotary motion on their axes merely from frictional contact with the pipe, or, if so preferred, from a suitable arrangement of gearing such as will give them any desired positive motion on their axes while they are being carried around the pipe by the rotation of the head B.

In making butt-welded pipe, the heated skelp, after being bent in suitable dies, is fed in between the rolls A A until its forward end is engaged by the rolls D. From this point on a positive feed-motion in the rolls A A is not essential, and may be wholly omitted, since the angular position of the rolls D enable them to draw the pipe along at the same time that by revolving around and on it they weld up the joint and finish the surface. The pipe thus completed is forced along through and out at the hollow or tubular axle or shaft $B^1$, and thus discharged.

In making lap-weld pipe the same devices are employed, and in the same way, with, however, the addition of a mandrel, $c$, which, by a stem, $c'$, is inserted through the tubular shaft $B^1$, and, by any suitable mechanism, is securely held in place. The mandrel $c$ should have a diameter equal or a little less than that of the bore of the pipe, and for practical purposes I have found that when inserted in the line of feed between rolls D, which have a long line of bite, its forward or first-engaging end should be about even with the corresponding end of the line of bite, and that its opposite end may terminate somewhat short of the other extremity of the line of bite, since the first part of the bite will effect the weld, and the remainder is required only or chiefly for giving the desired finish to the surface of the pipe. The skelp, whether made with a butt or a lap weld, is, preferably, fed into the rolls A A with the joint up, in which case the rolls A A will effect a partial weld.

When making lap-weld pipe with the use of a mandrel, c, its stem c' must be as long as the pipe, and as soon as the pipe is finished the stem must be detached from the fastening or stops by which it is held in place, so that the pipe may be removed. In Fig. 2 I have shown a lap-weld skelp, n', in the process of welding and finishing, and in Fig. 3 a butt-weld at n. The pipe in passing from the feed-rolls A A is guided by the hole s in the adjacent end of the head or stock B.

The rolls D may be employed in the manner set forth for welding or finishing alone, as well as for both purposes. Also, as a modification of the operation described, the head or stock B may, in some cases, be made non-rotating, and the pipe be fed forward and rotated, so as to be acted on circumferentially by the rolls D, and such modification I include as a part of my invention, though I believe the former operation to be the better. Also, by giving the rolls D a motion faster than that corresponding to the feeding motion of the rolls A, the former may be made to have a compressing and drawing effect on the pipe, so as not only to weld and finish, but also to lengthen it; and with a positive motion in the rolls D on their axes, especially in making lap-weld pipe, the feed-rolls A may be entirely dispensed with.

I claim as my invention—

1. For welding or finishing pipe, a series of two or more concave-faced rolls arranged in a rotating head or stock angularly to the line of feed, and when in operation revolving on their axes, and also acting circumferentially on the pipe either by the revolution of the pipe inside the rolls or by the revolution of the rolls around the pipe, substantially as set forth.

2. A series of two or more rolls, D, arranged and operating as set forth, in combination with grooved feed-rolls A A, for the purposes substantially as described.

3. Two or more rolls, D, arranged to act circumferentially on the pipe or skelp, in combination with a tubular bearing, axle or shaft through which the skelp or pipe is fed and delivered, substantially as set forth.

4. A mandrel, c, in combination with revolving circumferentially-bearing rolls D, substantially as described.

In testimony whereof I have hereunto set my hand.

MILDRED BLAKEY.

Witnesses:
JAMES M. CHRISTY,
GEORGE H. CHRISTY.